(12) United States Patent
Monsimert et al.

(10) Patent No.: US 11,528,886 B2
(45) Date of Patent: Dec. 20, 2022

(54) APPARATUS FOR FARMING ANIMALS SUCH AS PIGS

(71) Applicant: ASSERVA, Lamballe (FR)

(72) Inventors: Damien Monsimert, Lamballe (FR); Thibault Hersant, Lamballe (FR); Simon Rouxel, Lamballe (FR); Audrey Gloux, Lamballe (FR)

(73) Assignee: ASSERVA, Lamballe (FR)

( * ) Notice: Subject to any disclaimer, the term of this patent is extended or adjusted under 35 U.S.C. 154(b) by 79 days.

(21) Appl. No.: 17/231,656

(22) Filed: Apr. 15, 2021

(65) Prior Publication Data

US 2021/0321590 A1  Oct. 21, 2021

(30) Foreign Application Priority Data

Apr. 21, 2020  (FR) ...................................... 2003984

(51) Int. Cl.
*A01K 5/02* (2006.01)
*A01K 11/00* (2006.01)
*G05B 17/02* (2006.01)

(52) U.S. Cl.
CPC .......... *A01K 5/0283* (2013.01); *A01K 5/0291* (2013.01); *A01K 11/006* (2013.01); *G05B 17/02* (2013.01)

(58) Field of Classification Search
CPC ... A01K 5/0275; A01K 5/0291; A01K 5/0283
See application file for complete search history.

(56) References Cited

U.S. PATENT DOCUMENTS

| 2014/0000522 | A1* | 1/2014 | Christensen | A01K 5/0275 |
| | | | | 119/51.02 |
| 2015/0237825 | A1* | 8/2015 | Fallis | A01K 5/0275 |
| | | | | 119/51.11 |
| 2016/0227738 | A1* | 8/2016 | Ausman | A01K 5/0142 |
| 2017/0318779 | A1* | 11/2017 | Jerina | A01K 1/105 |
| 2021/0000068 | A1* | 1/2021 | Marichal | A01K 5/02 |

FOREIGN PATENT DOCUMENTS

| EP | 1236393 A2 * | 9/2002 | ............... A01K 5/02 |
| EP | 1300074 A2 | 4/2003 | |

OTHER PUBLICATIONS

Dec. 21, 2020 Search Report issued in French Patent Application No. 2003984.

* cited by examiner

*Primary Examiner* — Monica L Perry
(74) *Attorney, Agent, or Firm* — Oliff PLC

(57) ABSTRACT

An apparatus for farming animals, with a trough, a distributing system, an identifying system, a database and a control unit that allows, once an animal has been identified, the time passed 't' since the time $T_0$ corresponding to the last feed of said animal to be measured, a new value of the credit feed weight MC to be computed with the formula $$MC(t) = \frac{MP}{\Delta T} * (t - T_0) + MC_0$$

and a succession of feed portions to be distributed to the trough until the animal is sated or until a zero or negative credit feed weight MC is obtained.

8 Claims, 4 Drawing Sheets

[Fig. 1]
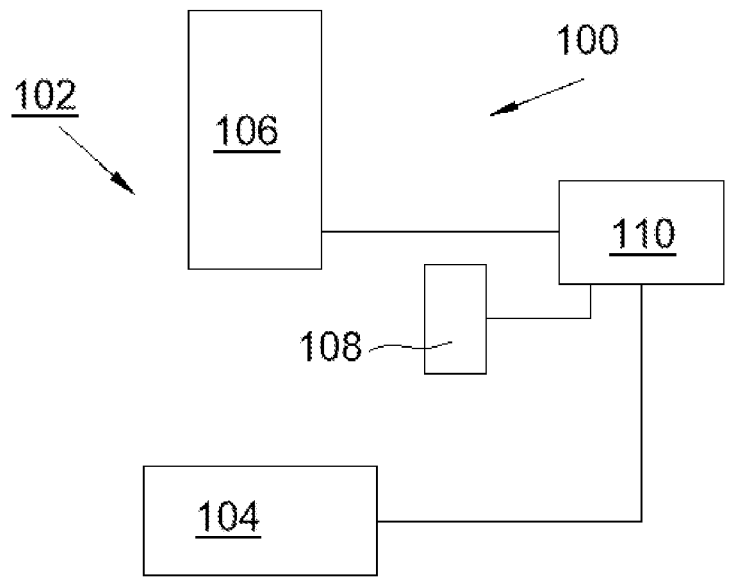
[Fig. 2]
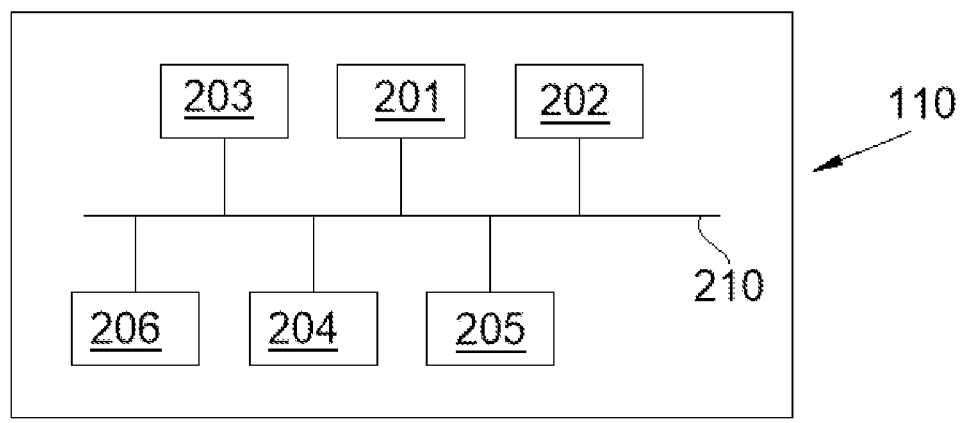

[Fig. 3]
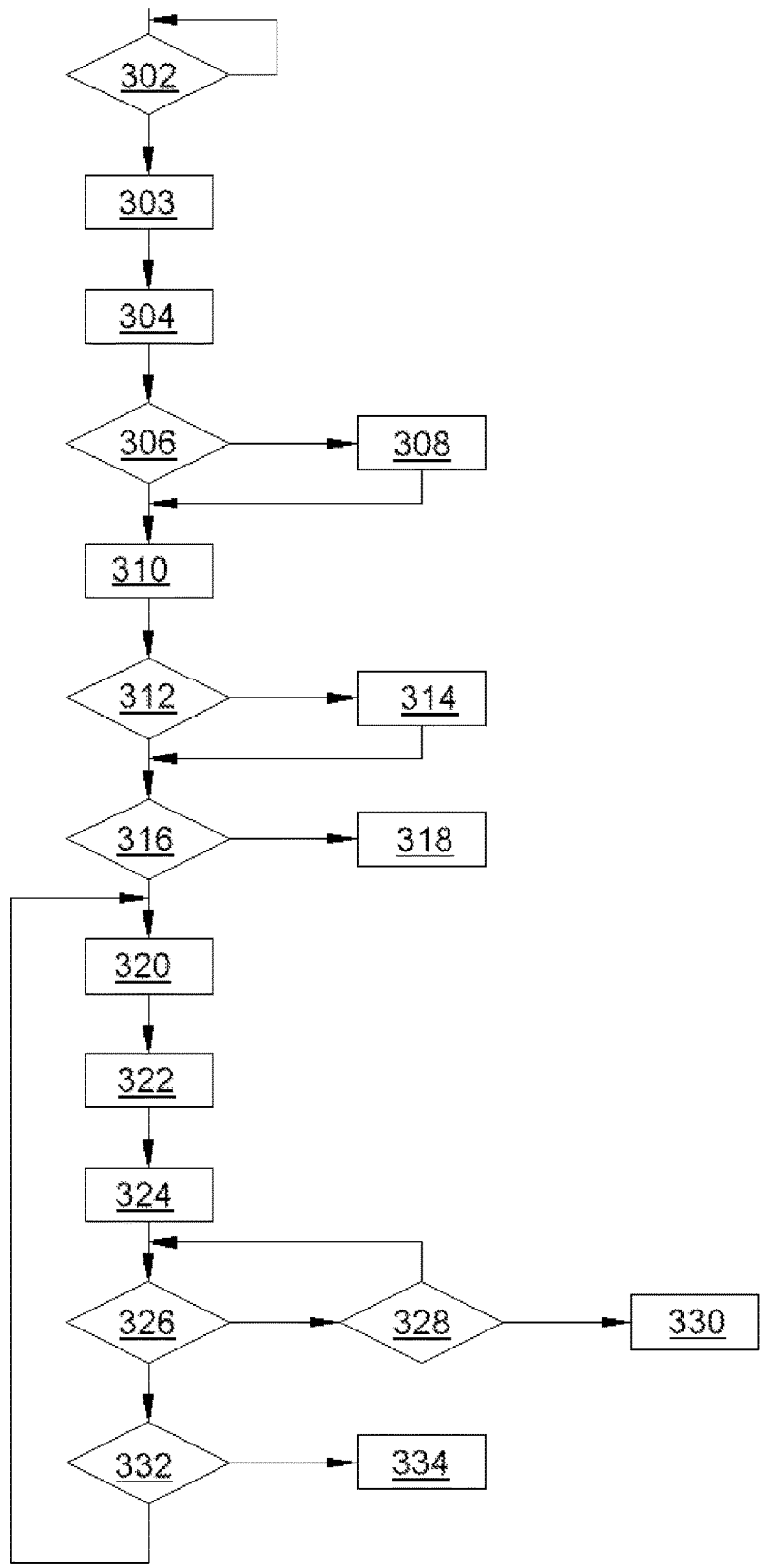

[Fig. 4]
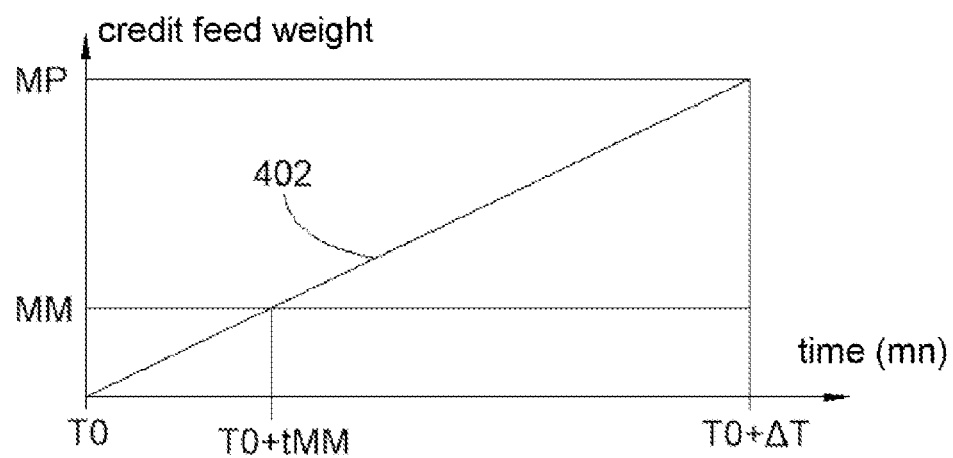

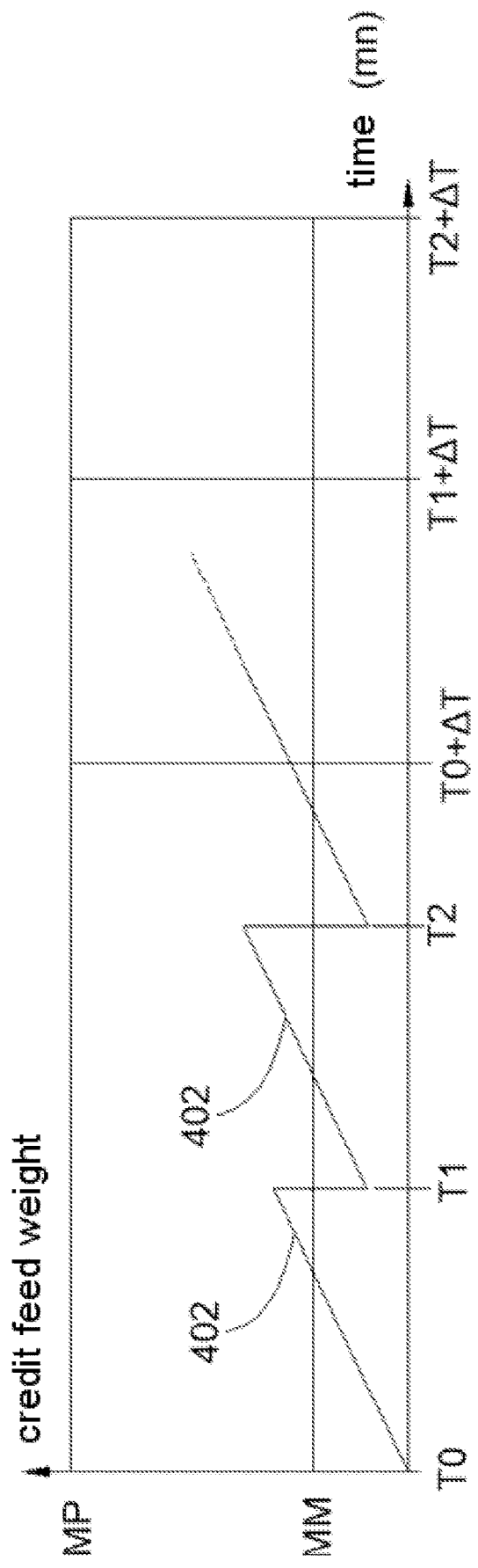

APPARATUS FOR FARMING ANIMALS SUCH AS PIGS

TECHNICAL FIELD

The present invention relates to an apparatus for farming animals such as pigs, and to a method for managing such a farming apparatus.

PRIOR ART

In a farming apparatus, the animals, in particular the pigs, are free to feed themselves from dedicated distributors that deliver feed rations.

Generally, the apparatus comprises one or more distributors, and each distributor is equipped with an identifying system, such as a radio-frequency identification (RFID) system, which allows an identification element (RFID chip) borne by the pig present in front of the distributor to be identified.

The information captured by the identifying system is transmitted to a control unit.

The distributor also comprises a trough and a distributing system that is commanded by the control unit to distribute a feed to the trough when the animal is positively identified by the identifying system.

Such an apparatus however has drawbacks because a climate of competition is generated between the pigs as regards access to the troughs, this possibly leading certain thereof to display aggressive behaviours.

It is therefore necessary for a managing method and a farming apparatus to be found that allow competition as regards access to the troughs to be limited.

SUMMARY OF THE INVENTION

One object of the present invention is to provide a farming apparatus that allows the rush of animals to the trough to be managed.

To this end, an apparatus for farming animals, each bearing one identification element, is provided, said apparatus comprising:
  a trough equipped with a sensor allowing the presence or absence of feed in the trough to be detected,
  a distributing system arranged to distribute portions of a feed to the trough,
  an identifying system allowing identification information stored in the identification element to be retrieved,
  a database containing, for each animal, the ceiling feed weight MP permitted for said animal for a given period $\Delta T$, a minimum weight MM of a ration, a credit feed weight MC, and a time '$T_0$' corresponding to the last time at which the animal received feed, and
  a control unit that is in communication with the sensor of the trough, the distributing system, the identifying system and the database, the control unit comprising:
  identifying and waiting means allowing the control unit, on the basis of the information delivered by the identifying system, to detect whether an animal is present, to identify it and to retrieve the data relating to the identified animal from the database,
  measuring means allowing the control unit to measure the time 't' passed since the time $T_0$ corresponding to the last feed of said animal,
  first computing means allowing the control unit to compute a new value of the credit feed weight MC with the formula $$MC(t) = \frac{MP}{\Delta T} * (t - T_0) + MC_0,$$

where $MC_0$ is a credit feed weight that remains to be consumed at the time $T_0$,
  third testing means allowing the control unit to compare the credit feed weight MC to the minimum weight MM,
  distributing means allowing, in the case where the credit feed weight MC is higher than the minimum weight MM, the control unit to command the distributing system in order to make it distribute a portion of feed to the trough,
  second computing means allowing the control unit to compute a new value of the credit feed weight MC via subtraction of the weight of the distributed portion, and
  updating means allowing the control unit to update the value of the time $T_0$ corresponding to the last feed with the value of the time 't' and to assign to the latter the value "$T_0+t$".

Thus, for each animal, the distribution cannot start before a certain time after the preceding feed and the animals regulate themselves.

Advantageously, the control unit furthermore comprises:
  fourth testing means allowing the control unit to determine whether feed is present or not in the trough on the basis of information delivered by the sensor,
  fifth testing means allowing the control unit, on the basis of the information delivered by the identifying system, to verify whether an animal is present in front of the trough and the identifying system, and
  sixth testing means allowing the control unit to test the value of the credit feed weight MC with respect to 0.

Advantageously, the control unit furthermore comprises first testing means allowing the control unit to compare the time passed 't' to the given period $\Delta T$, and first harmonizing means allowing the control unit to assign, to the time passed 't', the value of $\Delta T$ when the time passed 't' is greater than the given period $\Delta T$.

Advantageously, the control unit furthermore comprises second testing means allowing the control unit to compare the credit feed weight MC and the ceiling feed weight MP, and second harmonizing means allowing the control unit to assign, to the credit feed weight MC, the value of the ceiling feed weight MP when the credit feed weight MC is higher than the ceiling feed weight MP.

The invention also provides a distributing method implemented in an apparatus according to one of the preceding variants, said distributing method comprising:
  an identifying and waiting routine in which the control unit detects whether an animal is present, identifies it and retrieves the data relating to the identified animal from the database,
  a measuring step, in which the control unit measures the time 't' passed since the time $T_0$ corresponding to the last feed of said animal,
  a first computing step in which the control unit computes a new value of the credit feed weight MC with the formula $$MC(t) = \frac{MP}{\Delta T} * (t - T_0) + MC_0,$$

where $MC_0$ is a credit feed weight that remains to be consumed at the time $T_0$, a third testing step in which the control unit compares the credit feed weight MC thus computed to the minimum weight MM, a stopping step in the case where the credit feed weight MC is lower than the minimum weight MM, a distributing step in the case where the credit feed weight MC is higher than the minimum weight MM, and in which the control unit commands the distributing system in order to make it distribute a portion of feed to the trough, a second computing step in which the control unit computes a new value of the credit feed weight MC via subtraction of the weight of the distributed portion, an updating step in which the control unit updates the value of the time $T_0$ corresponding to the last feed with the value of the time 't' and assigns to the latter the value "$T_0$+t", and a looping routine in which, provided that the animal is present, that there is no feed in the trough and that the credit feed weight MC is positive, the distributing method loops to the distributing step.

Advantageously, the looping routine comprises, following the updating step:

a fourth testing step in which the control unit determines whether there is feed in the trough or not, in the case where there is feed in the trough, the looping routine continues to a fifth testing step in which the control unit verifies whether the animal is still present in front of the trough and the identifying system, in the case where the animal is no longer present, the looping routine continues to a stopping step, in the case where the animal is present, the looping routine loops to the fourth testing step, in the case where there is no feed in the trough, the looping routine continues to a sixth testing step in which the control unit tests the value of the credit feed weight MC with respect to 0, in the case where the credit feed weight MC is negative or zero, the looping routine continues to a stopping step, and in the case where the credit feed weight MC is positive, the looping routine loops to the distributing step.

Advantageously, the distributing method comprises, following the measuring step, a first testing step in which the control unit compares the time passed 't' to the given period $\Delta T$, and a first harmonizing step in which the control unit assigns, to the time passed 't', the value of $\Delta T$ when the time passed 't' is greater than the given period $\Delta T$, and whereby when the time passed 't' is less than the given period $\Delta T$ or after the first harmonizing step, the distributing method continues to the first computing step.

Advantageously, the distributing method comprises, following the first computing step, a second testing step in which the control unit compares the credit feed weight MC and the ceiling feed weight MP, and a second harmonizing step in which the control unit assigns, to the credit feed weight MC, the value of the ceiling feed weight MP when the credit feed weight MC is higher than the ceiling feed weight MP, and whereby, when the credit feed weight MC is lower than the ceiling feed weight MP or after the second harmonizing step, the distributing method continues to the third testing step.

BRIEF DESCRIPTION OF THE DRAWINGS

The aforementioned features of the invention, and others, will become more clearly apparent on reading the following description of one exemplary embodiment, said description being given with reference to the appended drawings, in which:

FIG. 1 illustrates a farming apparatus according to the invention,

FIG. 2 schematically illustrates an example of a hardware architecture of a control unit of the farming apparatus according to the invention, FIG. 3 schematically illustrates an algorithm of a method for managing an apparatus for farming animals according to the invention, FIG. 4 illustrates a timing diagram representative of the distribution of feed to a first animal, and FIG. 5 illustrates a timing diagram representative of the distribution of feed to a second animal.

DETAILED DESCRIPTION OF EMBODIMENTS

An apparatus for farming animals according to the invention allows a plurality of animals, pigs in particular, to be fed.

FIG. 1 shows the apparatus 100, which comprises a feed distributor 102 that is dedicated to feeding the animals and that comprises a trough 104 and a distributing system 106 that distributes portions of a feed to the trough 104, which is equipped with a sensor allowing the presence or absence of feed in the trough 104 to be detected; the sensor may be of any known type, and is for example a sensor such as a capacitive sensor.

The apparatus 100 also comprises an identifying system 108 that allows identification information stored in an identification element fastened to the animal to be retrieved. The identifying system 108 is for example an RFID system and the identification element is for example an RFID chip fastened to the animal and that makes the animal unique on the farm.

The apparatus 100 comprises a control unit 110 that is in communication with the identifying system 108 and that receives the identification information transmitted by the identifying system 108. On the basis of the received identification information, the control unit 110 identifies the animal present in front of the distributor 102.

The control unit 110 is also in communication with the distributing system 106, in order to command it to distribute a feed to the trough 104, and with the sensor of the trough 104, in order to know whether feed is present or not in the trough 104.

This type of apparatus is conventional as regards the operation of the distributor and, in particular, of the distributing system 106 and of the identifying system 108. These systems will not be described in more detail because they may take various forms known to those skilled in the art. In the same way, the communications between the control unit 110 and the distributing system 106, on the one hand, and the identifying system 108, on the other hand, are also things known to those skilled in the art and may take the form of wired or wireless communications.

The apparatus 100 also comprises a database in communication with the control unit 110 and that may be stored directly in a memory of the control unit 110 or in a memory external to the control unit 110.

FIG. 2 schematically illustrates an example of a hardware architecture of the control unit 110.

The control unit 110 then comprises, connected by a communication bus 210: a processor or central processing unit (CPU) 201; a RAM 202; a ROM 203; a storage unit 204 or a storage-medium reader, such as a hard disk drive (HDD); a communication interface 205 allowing the various components of the apparatus 100 to be communicated with and a user interface (UI) 206 allowing the control unit 110 to interact with a user, especially with a view to configuring the apparatus 100.

The processor 201 is capable of executing instructions loaded into the RAM 202 from the ROM 203, from an external memory, from a storage medium, or from a communication network. When the apparatus 100 is turned on, the processor 201 is capable of reading from the RAM 202 instructions and to execute them. These instructions form a computer program that causes the implementation, by the processor 201, of all or some of the algorithms and steps described here in relation to the apparatus 100.

All or some of the algorithms and steps described below in relation to the apparatus 100 may thus be implemented in software form via execution of a set of instructions by a programmable machine, such as a DSP or a processor, or be implemented in hardware form via a machine or a dedicated component, such as an FPGA or an ASIC.

In the database is stored information related to each animal and the database is managed by the user.

The information stored in the database for each animal relates to:
- the ceiling feed weight MP permitted to said animal for a given period $\Delta T$, i.e. the total weight of feed that the animal may receive in the given period $\Delta T$, which is typically 24 hours,
- the minimum weight MM of a ration, i.e. the weight of feed above which distribution of feed is permitted,
- a credit feed weight MC, i.e. the weight of feed that the animal still has the right to eat, and
- the last time '$T_0$' at which the animal received feed.

The distributing principle is based on a time-linear computation of the credit feed weight MC and a permission to distribute if the credit feed weight MC is higher than the minimum weight MM.

FIG. 4 shows an example with a first animal consuming its entire daily ration in a single feed and FIG. 5 shows an example with a second animal consuming its daily ration in a plurality of feeds.

The distributing method may be considered to be a time window, of a duration equal to the given period $\Delta T$, that moves each time the animal feeds.

In the case of FIG. 4, there is one window that extends from $T_0$ to $T_0+\Delta T$.

In the case of FIG. 5, there are three windows the next of which is passed on each feed. The first window starts at $T_0$, the second window starts at the first feed $T_1=T_0+t_1$ and the third window starts at the second feed $T_2=T_0+t_2$.

In FIG. 5, on each feed, the last feeding time is updated and therefore successively becomes $T_0$, $T_1$ and $T_2$.

The system of axes shows the credit feed weight MC as a function of time during the given period $\Delta T$, here 24 hours, i.e. between two successive feedings at $T_0$ et $T_0+\Delta T$.

The ceiling weight MP corresponds to the total weight of feed that the animal may receive during the given period $\Delta T$.

The minimum weight MM is the minimum weight below which no feed may be distributed to the animal.

The straight line 402 represents the credit feed weight MC, which is a linear function of time that has a slope given by the formula:

$$\frac{MP}{\Delta T}$$

The credit feed weight not consumed in the preceding period, i.e. the credit feed weight that remains to be consumed at the time $T_0$, will be called $MC_0$.

In the case of FIG. 4, $MC_0$ is equal to 0.

In the case of FIG. 5, $MC_0$ is equal to 0 at $T_0$, and different from 0 at $T_1$ and $T_2$ when it corresponds to the weight not delivered at $T_1$ and at $T_2$.

The equation of each straight line 402 is thus modified on each feed $T_0$ and its equation is given by the formula:

$$MC(t) = \frac{MP}{\Delta T} * (t - T_0) + MC_0.$$

The time $t_{MM}$ passed since the last feed $T_0$ and corresponding to the minimum weight MM is then given by the formula:

$$t_{MM} = \frac{MM - MC_0}{MP} * \Delta T + T_0.$$

That is to say that provided that the time passed $t_{MM}$ since the last feed ($T_0$) is less than $$\frac{MM - MC_0}{MP} * \Delta T + T_0,$$

there is no distribution and the animal moves off without eating.

Gradually, each animal will adapt its feeding pattern depending on its minimum weight MM and on the time passed since its last feed and will not seek to feed until the minimum weight MM has been reached.

FIG. 3 shows an algorithm of the distributing method according to the invention.

The distributing method comprises an identifying and waiting routine 302, 303 in which the control unit 110 detects whether an animal is present, identifies it and retrieves the data relating to the identified animal from the database.

In the embodiment of the invention presented here, the waiting routine comprises a waiting step 302 and an identifying step 303.

In the waiting step 302, the control unit 110 tests whether an animal is present in front of the trough 104 and the identifying system 108.

Provided that no animal is present, the distributing method loops to the waiting step 302.

When an animal is present, the distributing method continues to the identifying step 303, in which the control unit 110 retrieves the identifier of the animal via analysis of the data transmitted by the identifying system 108 and comparison with the data of the database.

On the basis of this identifier, the control unit 110 consults the database with a view to retrieving the time $T_0$ corresponding to the last feed of said animal, the ceiling feed weight MP of said animal, the credit feed weight $MC_0$ not consumed in the preceding period, and the minimum weight of a ration MM.

During the initialization of the apparatus 100, the time $T_0$ of each animal is set to 0 for example and all the other data are stored in the database by the user.

The distributing method continues to a measuring step 304, in which the control unit 110 measures the time 't' passed since the time $T_0$ corresponding to the last feed of said animal.

The distributing method continues to a first computing step 310 in which the control unit 110 computes a new value of the credit feed weight MC with the formula $$MC(t) = \frac{MP}{\Delta T} * (t - T_0) + MC_0.$$

The distributing method continues to a third testing step 316 in which the control unit 110 compares the credit feed weight MC thus computed to the minimum weight MM.

In the case where the credit feed weight MC is lower than the minimum weight MM, the distributing method continues to a stopping step 318 of not distributing feed.

In the case where the credit feed weight MC is higher than the minimum weight MM, the distributing method continues to a distributing step 320 in which the control unit 110 commands the distributing system 106 in order to make it distribute a portion of feed to the trough 104. The distributing system 106 is arranged to deliver a portion of a small weight (about 100 g) and thus to deliver a credit feed weight potentially in a plurality of portions.

The distributing system 106 will successively deliver a plurality of portions, the animal eating each portion one after the other until sated and leaving as little as possible in the trough 104. Specifically, the effect of delivering too large a portion may be that the animal would not eat the entire portion and would leave a large amount thereof in the trough 104, resulting in a corresponding error in the amount of feed that it is thought to have received. The following steps implement this principle of successive deliveries of portions.

The distributing method continues to a second computing step 322 in which the control unit 110 computes a new value of the credit feed weight MC via subtraction of the weight of the distributed portion.

The distributing method continues to a updating step 324 in which the control unit 110 updates the value of the time $T_0$ corresponding to the last feed with the value of the time 't' and then assigns to the latter the value "$T_0+t$", which becomes the new time $T_0$ corresponding to the last feed.

The distributing method continues to a looping routine 326, 338, 332 in which, provided that the animal is present, that there is no feed in the trough 104 (i.e. that the trough 104 is empty) and that the credit feed weight MC is positive, the distributing method loops to the distributing step 320.

Such a distributing method then allows a better management of the presence of animals at the trough 104 because each learns from when it may come.

The control unit 110 thus comprises:
identifying and waiting means allowing the control unit 110, on the basis of the information delivered by the identifying system 108, to detect whether an animal is present, to identify it and to retrieve the data relating to the identified animal from the database,
measuring means allowing the control unit 110 to measure the time 't' passed since the time $T_0$ corresponding to the last feed of said animal,
first computing means allowing the control unit 110 to compute a new value of the credit feed weight MC with the formula M $$MC(t) = \frac{MP}{\Delta T} * (t - T_0) + MC_0,$$

third testing means allowing the control unit 110 to compare the credit feed weight MC to the minimum weight MM,
distributing means allowing, in the case where the credit feed weight MC is higher than the minimum weight MM, the control unit 110 to command the distributing system 106 in order to make it distribute a portion of feed to the trough 104,
second computing means allowing the control unit 110 to compute a new value of the credit feed weight MC via subtraction of the weight of the distributed portion, and
updating means allowing the control unit 110 to update the value of the time $T_0$ corresponding to the last feed with the value of the time 't' and to assign to the latter the value "$T_0+t$".

In the embodiment of the invention presented here, the looping routine comprises, following the updating step 324, a fourth testing step 326 in which the control unit 110 determines whether there is feed in the trough 104 or not on the basis of the information received from the sensor of the trough 104.

In the case where there is feed in the trough 104 (i.e. the trough 104 is not empty), the looping routine continues to a fifth testing step 328 in which the control unit 110 verifies whether the animal is still present in front of the trough 104 and the identifying system 108, via analysis of the data transmitted by the identifying system 108.

In the case where the animal is no longer present, the looping routine continues to a stopping step 330.

In the case where the animal is present, the looping routine loops to the fourth testing step 326.

In the case where there is no feed in the trough 104 (i.e. the trough 104 is empty), the looping routine continues to a sixth testing step 332 in which the control unit tests the value of the credit feed weight MC with respect to 0.

In the case where the credit feed weight MC is negative or zero, this means that the animal has received all the credit feed weight MC to which it had a right and the looping routine continues to a stopping step 334.

In the case where the credit feed weight MC is positive, this means that the animal has not received all the credit feed weight MC to which it had a right and the looping routine loops to the distributing step 320.

The looping routine may be realized in various ways. For example, the various testing steps may be interleaved with a different organization.

For example, after the updating step 324, the looping routine continues successively with the fifth testing step 328, which consists in testing for the presence of the animal, then the fourth testing step 326, which consists in testing for the presence or absence of feed in the trough 104, and lastly the sixth testing step 332, which consists in testing the credit feed weight.

The passage from the fifth testing step 328 to the fourth testing step 326 occurs when the animal is present, the passage from the fourth testing step 326 to the sixth testing step 302 occurring when there is no longer any feed in the trough 104, i.e. when it is empty.

When the animal is no longer present, the fifth testing step 328 continues to the stopping step 330. Provided that there is feed in the trough 104, the fourth testing step 326 loops to the fifth testing step 328. Provided that the credit feed weight MC is positive, the sixth testing step 332 loops to the distributing step 320.

In this embodiment, the control unit 110 furthermore comprises:
  fourth testing means allowing the control unit 110 to determine whether feed is present or not in the trough 104 on the basis of information delivered by the sensor,
  fifth testing means allowing the control unit 110, on the basis of the information delivered by the identifying system 108, to verify whether an animal is present in front of the trough 104 and the identifying system 108, and
  sixth testing means allowing the control unit 110 to test the value of the credit feed weight MC with respect to 0.

According to one particular embodiment, it is necessary to make provision for the fact that the animal might wait longer than the given period ΔT to feed. To this end, the distributing method comprises, following the measuring step 304, a first testing step 306 in which the control unit 110 compares the time passed 't' to the given period ΔT, and a first harmonizing step 308 in which the control unit 110 assigns, to the time passed 't', the value of ΔT when the time passed 't' is greater than the given period ΔT, and when the time passed 't' is less than the given period ΔT or after the first harmonizing step, the distributing method continues to the first computing step 310.

In this embodiment, the control unit 110 furthermore comprises first testing means allowing the control unit 110 to compare the time passed 't' to the given period ΔT, and first harmonizing means allowing the control unit 110 to assign, to the time passed 't', the value of ΔT when the time passed 't' is greater than the given period ΔT.

According to one particular embodiment, it is necessary to make provision for the fact that the animal might have had some unconsumed leftover feed and have waited the given period ΔT to feed. To this end, the distributing method comprises, following the first computing step 310, a second testing step 312 in which the control unit 110 compares the credit feed weight MC thus computed and the ceiling feed weight MP, and a second harmonizing step 314 in which the control unit 110 assigns, to the credit feed weight MC thus computed, the value of the ceiling feed weight MP when the credit feed weight MC is higher than the ceiling feed weight MP, and, when the credit feed weight MC is lower than the ceiling feed weight MP or after the second harmonizing step 314, the distributing method continues to the third testing step 316.

In this embodiment, the control unit 110 furthermore comprises second testing means allowing the control unit 110 to compare the credit feed weight MC and the ceiling feed weight MP, and second harmonizing means allowing the control unit 110 to assign, to the credit feed weight MC, the value of the ceiling feed weight MP when the credit feed weight MC is higher than the ceiling feed weight MP.

The time passed is for example measured via a routine implemented in the control unit 110 and employing a means, such as a stopwatch for example, for measuring the time passed.

The invention claimed is:

1. An apparatus for farming animals, each bearing one identification element, said apparatus (100) comprising:
  a trough equipped with a sensor allowing the presence or absence of feed in the trough to be detected,
  a distributing system arranged to distribute portions of a feed to the trough (104),
  an identifying system allowing identification information stored in the identification element to be retrieved,
  a database containing, for each animal, the ceiling feed weight MP permitted for said animal for a given period ΔT, a minimum weight MM of a ration, a credit feed weight MC, and a time '$T_0$' corresponding to the last time at which the animal received feed, and
  a control unit that is in communication with the sensor of the trough, the distributing system, the identifying system and the database, the control unit comprising:
  identifying and waiting means allowing the control unit, on the basis of the information delivered by the identifying system, to detect whether an animal is present, to identify it and to retrieve the data relating to the identified animal from the database,
  measuring means allowing the control unit to measure the time 't' passed since the time $T_0$ corresponding to the last feed of said animal,
  first computing means allowing the control unit to compute a new value of the credit feed weight MC with the formula $$MC(t) = \frac{MP}{\Delta T} * (t - T_0) + MC_0,$$

where $MC_0$ is a credit feed weight that remains to be consumed at the time $T_0$,
  third testing means allowing the control unit to compare the credit feed weight MC to the minimum weight MM,
  distributing means allowing, in the case where the credit feed weight MC is higher than the minimum weight MM, the control unit to command the distributing system in order to make it distribute a portion of feed to the trough,
  second computing means allowing the control unit to compute a new value of the credit feed weight MC via subtraction of the weight of the distributed portion, and
  updating means allowing the control unit to update the value of the time $T_0$ corresponding to the last feed with the value of the time 't' and to assign to the latter the value "$T_0+t$".

2. The farming apparatus according to claim 1, wherein the control unit further comprises:
  fourth testing means allowing the control unit to determine whether feed is present or not in the trough on the basis of information delivered by the sensor,
  fifth testing means allowing the control unit, on the basis of the information delivered by the identifying system, to verify whether an animal is present in front of the trough and the identifying system, and
  sixth testing means allowing the control unit to test the value of the credit feed weight MC with respect to 0.

3. The farming apparatus according to claim 1, wherein the control unit further comprises first testing means allowing the control unit to compare the time passed 't' to the given period ΔT, and first harmonizing means allowing the control unit to assign, to the time passed 't', the value of ΔT when the time passed 't' is greater than the given period ΔT.

4. The farming apparatus according to claim 3, wherein the control unit further comprises second testing means allowing the control unit to compare the credit feed weight MC and the ceiling feed weight MP, and second harmonizing means allowing the control unit to assign, to the credit feed weight MC, the value of the ceiling feed weight MP when the credit feed weight MC is higher than the ceiling feed weight MP.

5. The distributing method implemented in an apparatus according to claim 1, said distributing method comprising:
an identifying and waiting routine in which the control unit detects whether an animal is present, identifies it and retrieves the data relating to the identified animal from the database,
a measuring step, in which the control unit measures the time 't' passed since the time $T_0$ corresponding to the last feed of said animal,
a first computing step in which the control unit computes a new value of the credit feed weight MC with the formula $$MC(t) = \frac{MP}{\Delta T} * (t - T_0) + MC_0,$$

where $MC_0$ is a credit feed weight that remains to be consumed at the time $T_0$,
a third testing step in which the control unit compares the credit feed weight MC thus computed to the minimum weight MM,
a stopping step in the case where the credit feed weight MC is lower than the minimum weight MM,
a distributing step in the case where the credit feed weight MC is higher than the minimum weight MM, and in which the control unit commands the distributing system in order to make it distribute a portion of feed to the trough,
a second computing step in which the control unit computes a new value of the credit feed weight MC via subtraction of the weight of the distributed portion,
an updating step in which the control unit updates the value of the time $T_0$ corresponding to the last feed with the value of the time 't' and assigns to the latter the value "$T_0+t$", and
a looping routine in which, provided that the animal is present, that there is no feed in the trough (104) and that the credit feed weight MC is positive, the distributing method loops to the distributing step.

6. The distributing method according to claim 5, wherein the looping routine comprises, following the updating step:
a fourth testing step in which the control unit determines whether there is feed in the trough or not,
in the case where there is feed in the trough, the looping routine continues to a fifth testing step in which the control unit verifies whether the animal is still present in front of the trough and the identifying system,
in the case where the animal is no longer present, the looping routine continues to a stopping step,
in the case where the animal is present, the looping routine loops to the fourth testing step,
in the case where there is no feed in the trough, the looping routine continues to a sixth testing step in which the control unit tests the value of the credit feed weight MC with respect to 0,
in the case where the credit feed weight MC is negative or zero, the looping routine continues to a stopping step, and
in the case where the credit feed weight MC is positive, the looping routine loops to the distributing step.

7. The distributing method according to claim 5, further comprising: following the measuring step, a first testing step in which the control unit compares the time passed 't' to the given period $\Delta T$, and a first harmonizing step in which the control unit assigns, to the time passed 't', the value of $\Delta T$ when the time passed 't' is greater than the given period $\Delta T$, and whereby, when the time passed 't' is less than the given period $\Delta T$ or after the first harmonizing step, the distributing method continues to the first computing step.

8. The distributing method according to claim 7, further comprising: following the first computing step, a second testing step in which the control unit compares the credit feed weight MC and the ceiling feed weight MP, and a second harmonizing step in which the control unit assigns, to the credit feed weight MC, the value of the ceiling feed weight MP when the credit feed weight MC is higher than the ceiling feed weight MP, and whereby, when the credit feed weight MC is lower than the ceiling feed weight MP or after the second harmonizing step, the distributing method continues to the third testing step.

* * * * *